June 10, 1969  O. A. FREDRIKSSON ETAL  3,449,657
HELICAL ANTENNA FOR IRRADIATING AN EARTH FORMATION
PENETRATED BY A BOREHOLE AND METHOD OF USING SAME
Filed Nov. 14, 1966                                    Sheet 3 of 6
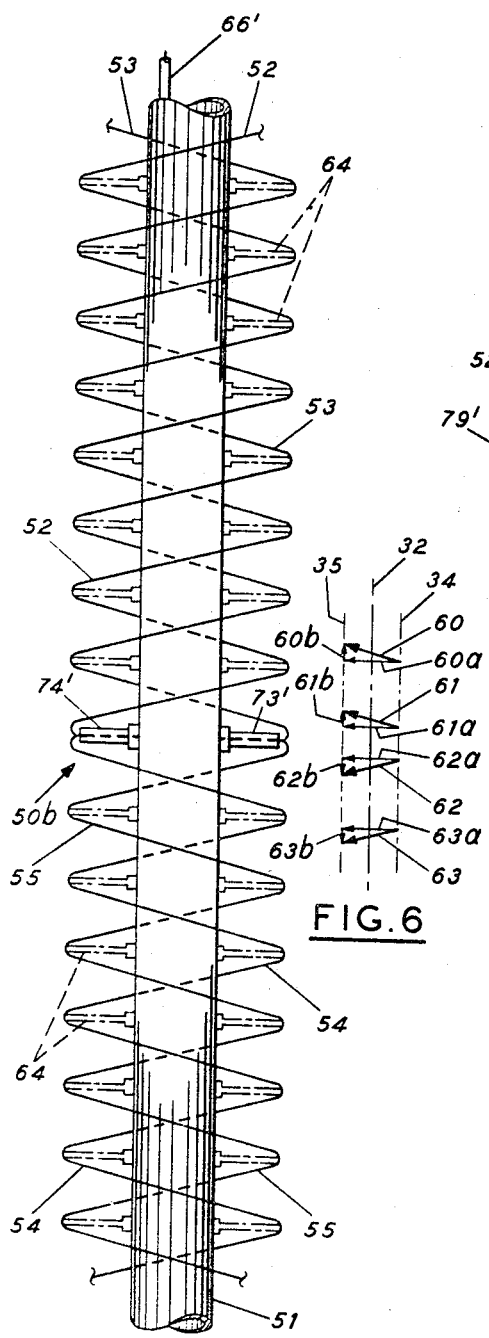
FIG. 6
FIG. 9
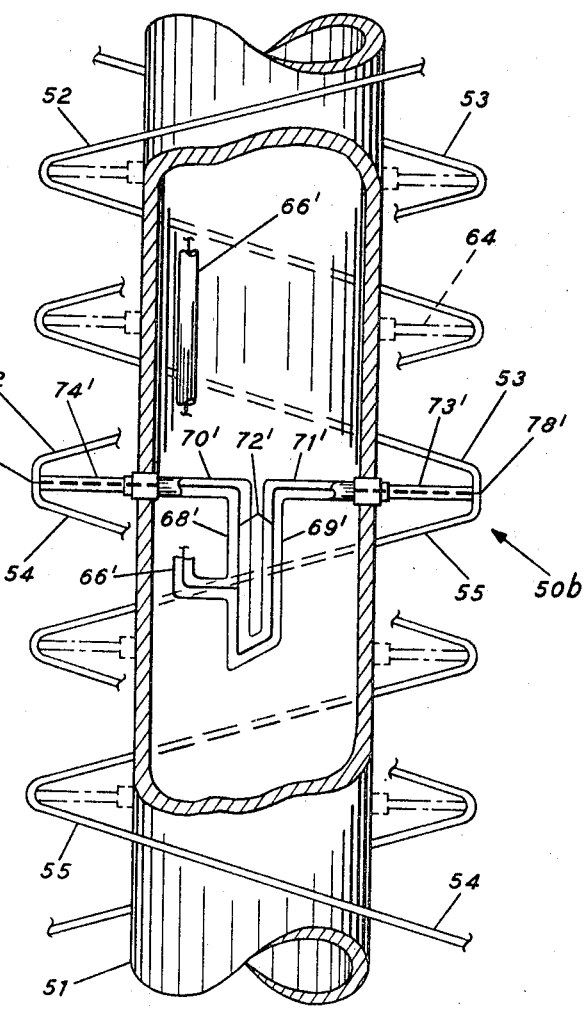
FIG. 10
INVENTORS
OKE A. FREDRIKSSON
F. NICHOLAS FOSSATI
F. ALEXANDER ROBERTS
BY
ATTORNEYS INVENTORS
OKE A. FREDRIKSSON
F. NICHOLAS FOSSATI
F. ALEXANDER ROBERTS
BY
ATTORNEYS

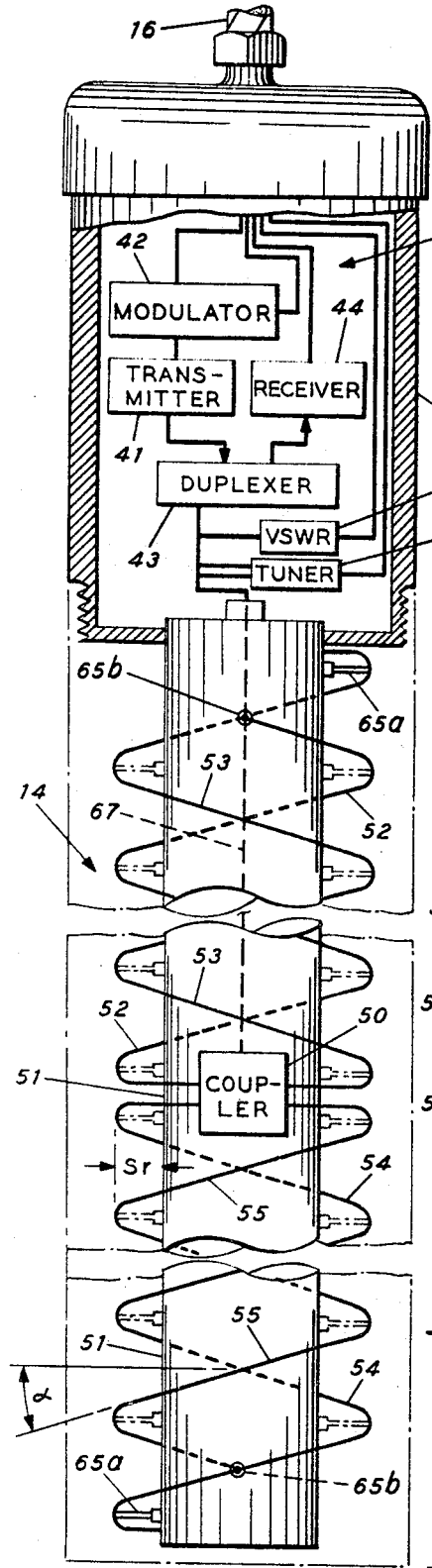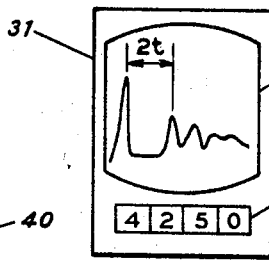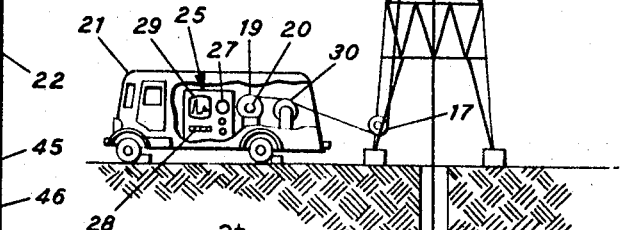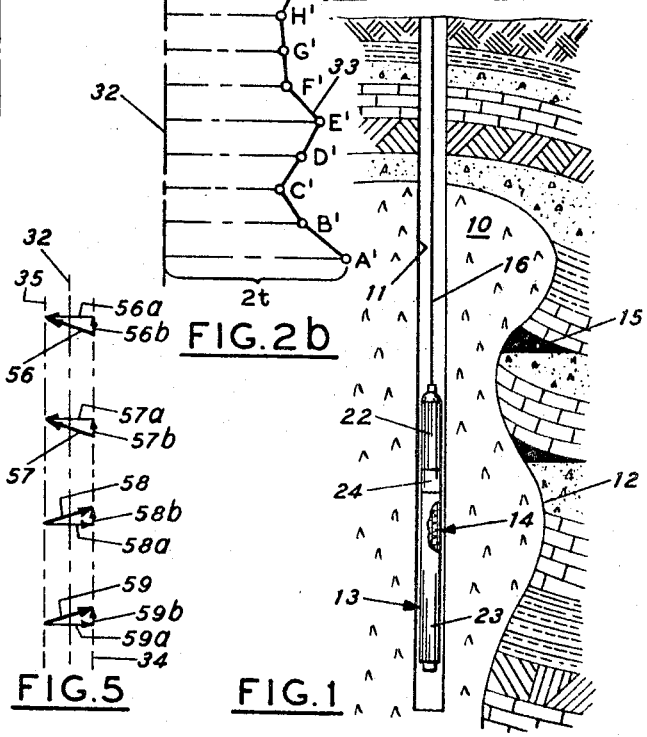
INVENTORS
OKE A. FREDRIKSSON
F. NICHOLAS FOSSATI
F. ALEXANDER ROBERTS
ATTORNEYS

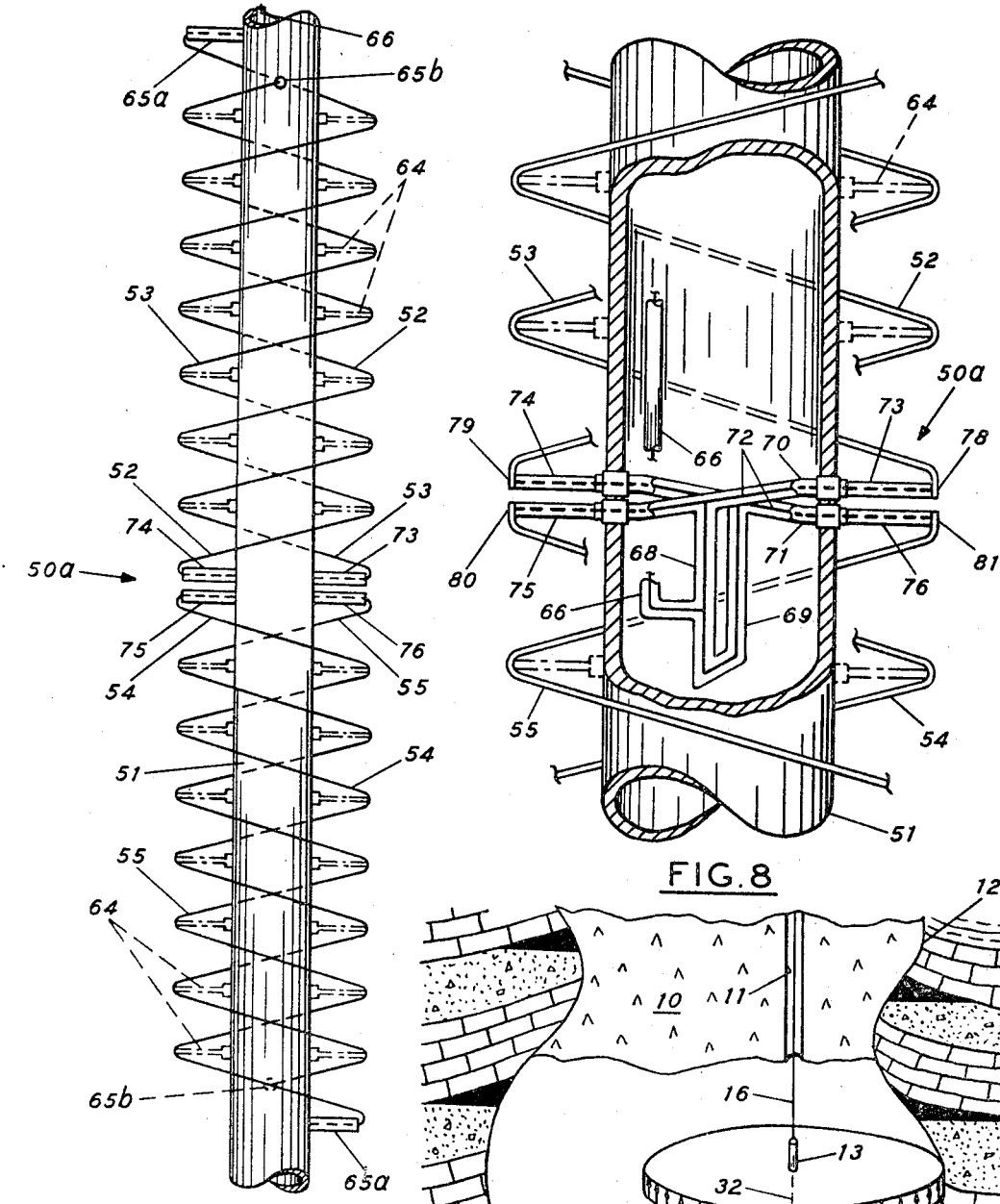

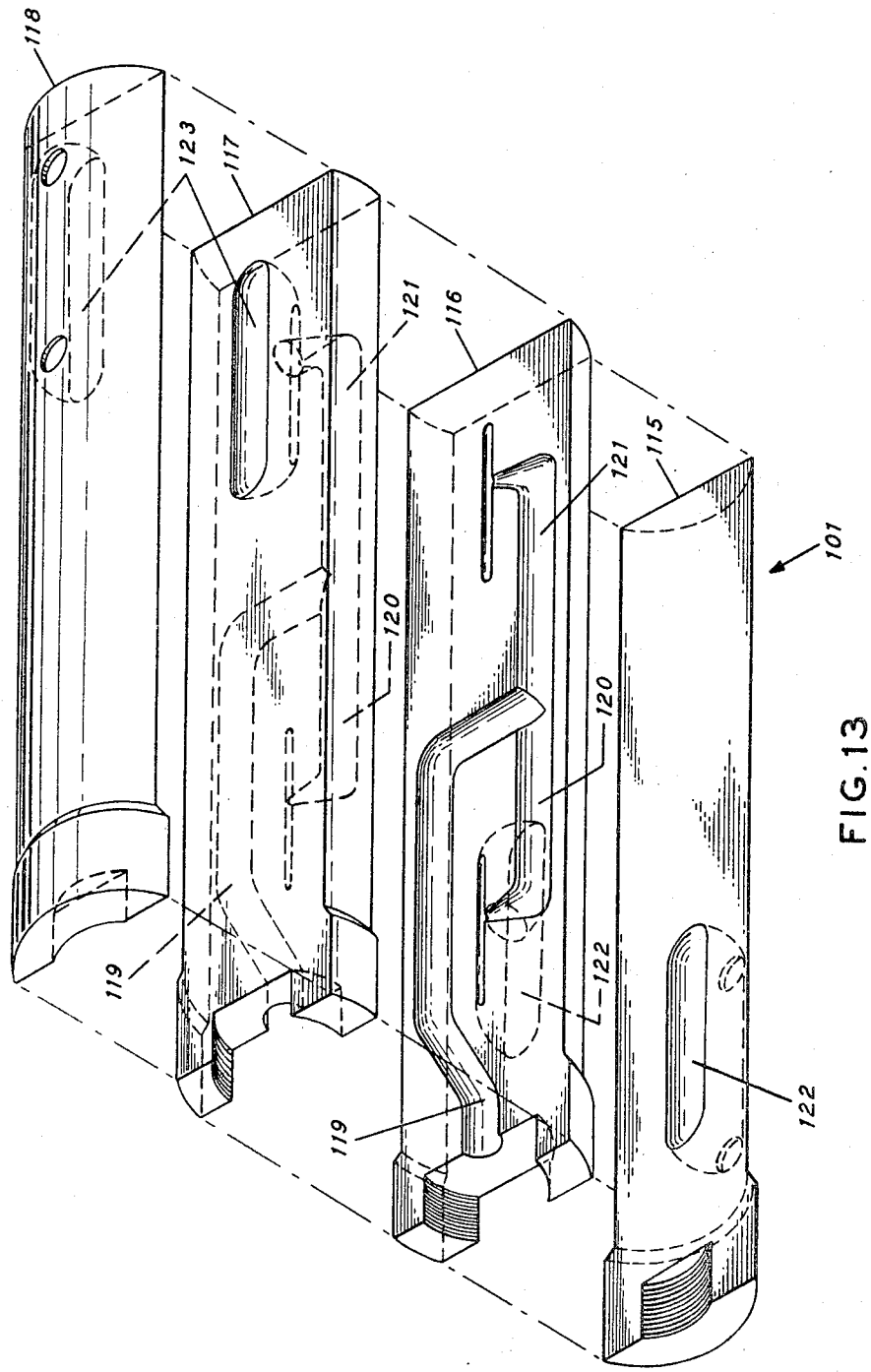

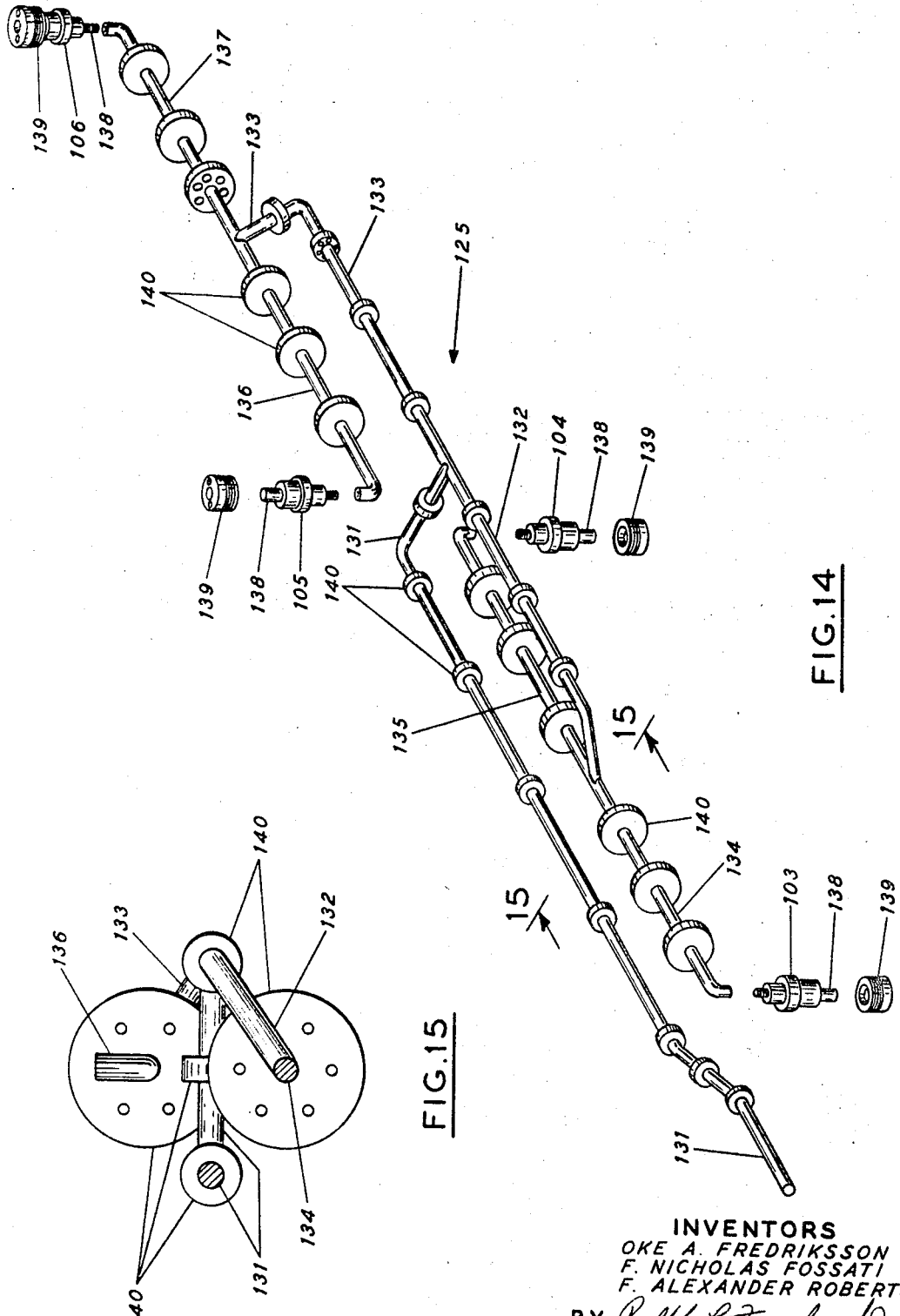

United States Patent Office 3,449,657
Patented June 10, 1969

3,449,657
HELICAL ANTENNA FOR IRRADIATING AN EARTH FORMATION PENETRATED BY A BOREHOLE AND METHOD OF USING SAME
Oke A. Fredriksson, Fullerton, F. Nicholas Fossati, Lafayette, and F. Alexander Roberts, Brea, Calif., assignors to Chevron Research Company, San Francisco, Calif., a corporation of Delaware
Filed Nov. 14, 1966, Ser. No. 593,967
Int. Cl. G01v 3/12
U.S. Cl. 324—6     19 Claims

ABSTRACT OF THE DISCLOSURE

A subsurface earth formation exploration tool for logging an earth formation penetrated by a well bore to approximate the distance to an electromagnetic discontinuity in the formation, the tool including a helical antenna for irradiating the formation with electromagnetic energy in a plane transverse to the axis of the borehole. The helical antenna is sufficiently reduced in diameter to fit within standard size boreholes, yet has high radiation intensity per unit length by the use of first and second pairs of helical conducting elements wound along a central disposed conductor element axially elongated along the axis of the borehole. The helical antenna also includes coupling means adjacent to the midpoint of the central conducting element in electrical contact with the helical elements. Energy is coupled between the central element and the pairs of helical conducting elements using energization points selected to produce first and second pairs of electromagnetic waves, each of which propagating in phase in opposed axial directions along the antenna.

---

This invention relates to the exploration for oil around a salt dome and to the mapping of the sides of the salt body from within a borehole penetrating the salt dome. More particularly, the invention relates to a method and apparatus for sequentially emitting electromagnetic energy from an antenna system within the well bore into the salt dome at a known elevation and receiving reflections of the launched energy from the sides of the dome. The transmission, reflection and reception of the energy are then related to time; and the time of travel of the emitted energy (from the source to the reflector and back) is related to horizontal distance and recorded in accordance with the depth of the antenna below the earth's surface to permit mapping of the interface of the salt dome.

A particular object of the present invention is a method and apparatus for improving the gain and efficiency of a helical antenna housed within a compactly constructed sonde traversing the borehole penetrating the salt dome. The improved gain and efficiency of the antenna are at least partially derived from the design of the antenna system and related energization equipment to provide the transfer of radiation through the dome. The field radiated by the antenna of the present invention is omnidirectional in azimuth to permit uniform distribution of the radiated energy to all points in circles concentric of the antenna. In the elevational direction—i.e., in planes normal to the surface of the earth—the field is highly directional.

The art to which the present invention relates is described in a copending application of W. T. Holser, R. R. Unterberger and S. B. Jones, Ser. No. 253,339, filed Jan. 23, 1963, for "Method of Mapping a Salt Dome at Depth by Measuring the Travel Time of Electromagnetic Energy Emitted from a Borehole Drilled Within the Salt Dome." In that application, a method is described for mapping the distance to the flanks of a salt dome from within a well bore penetrating the dome.

It is known that an antenna may be formed by winding a conductor helically about a conductive supporting mast and that such an antenna may be energized to propagate energy in an equiazimuthal pattern relative to the longitudinal axis of the mast. Such an antenna, known as a helical antenna, is disclosed in U.S. patents, No. 2,985,878, L. O. Krouse et al., issued May 23, 1961, for "Wound Antenna with Conductive Support," and No. 2,953,786, L. O. Krouse, issued Sept. 20, 1960, for "Antenna for Polarized Propagation."

In a helical antenna of the type described in the prior art patents, one conductor of the pair of conductors forming the transmission line feeding the antenna is connected to the supporting mast of the antenna and the other conductor is wound helically with a prescribed pitch and turn length about and supported on the mast. The mast is formed of conductive material, and usually a number of turns are wound about the mast. The wound element is then terminated at a distance from the feed end. If the axial length of the antenna is short, the characteristic impedance of this system may be maintained by impedance elements at the terminal ends of the antenna.

A concern of the present application is a helical antenna system used to accomplish emission of electromagnetic radiation—directional in elevation but omnidirectional in azimuth—within the environment of a borehole drilled thousands of feet into a salt dome. The radiated electromagnetic energy is transmitted through the dome and then reflected from the electromagnetic discontinuity formed at the flanks of the dome spaced from the borehole. The travel time of the energy to the reflector and back is measured, and the distance from the antenna to the near salt flank is approximated by computation from the known velocity of energy transmission through the salt to permit a partial mapping of the dome.

Several problems become evident in adapting conventionally formed helical antennas for use in the above method of logging of salt domes:

(1) The conventional helical antenna within an exploration sonde may be too large for the standard sized boreholes drilled into the salt dome, say from five to twelve inches in diameter;

(2) Where the antenna size is reduced to form a more compact design, gain and directivity characteristics of the antenna may not be adequate to map large sized domes, especially where severe downhole environmental conditions are encountered—e.g., high pressure, high temperature, etc.

(3) The beam width (elevational spread) of the emitted electromagnetic radiation may be too wide. Accordingly, it may be difficult to obtain, among other things, high resolution of the returning signals (echoes) from the near wall of the dome; and (4) The support of the antenna within the sonde may be inadequate to withstand usual shocks, static and bending loads encountered in conventional logging practice.

In accordance with the present invention, the effective area of radiation of the helical antenna—and, hence, antenna gain—is increased by forming the antenna radiating elements of a multiplicity of coextensive pairs of interwound helical conductors extending along the well bore, say for fifteen feet. The radiation intensity per unit length of antenna is increased without requiring a corresponding increase in the required overall diameter of the antenna by employing dual propagating conductors along the antenna. A broadside pattern of radiation is accomplished in the antenna of the present invention by including a central conducting cylinder concentric within and coextensive of the helical conductors. Radiation of minimum beam width is accomplished by establishing the turn length of the helical conductors as an integral number of operating wavelengths of the energy as it is transmitted within the salt dome.

The antenna is a part of a logging tool, and a source of electromagnetic energy may be housed in the upper end of the logging tool and connected to the antenna by an appropriately constructed input coupler ruggedly supported within the central cylinder. Energy is emitted from the source, progresses through the coupler and thence between the helices, conductors and central cylinders so as to radiate in elevational planes normal to the well bore. The electrical circuit of the antenna is closed by interconnecting the input coupler with both the central cylinder and the helical conductors.

Preferably, but not necessarily, the ends of the helical conductors are terminated in contact with the central cylinder remote from the input coupler and at appropriately spaced locations so as to provide nonreflective termination of the energy input to the antenna. The terminal locations are preferably spaced apart a circumferential length measured along the path of one of the pairs of helical conductors equal to $N\lambda_f/4$, where N is any odd integer and $\lambda_f$ is the formation wavelength. The voltage standing wave ratio (VSWR) of the antenna is accordingly decreased with corresponding improvements in antenna performance—for example, gain and directivity.

Further in accordance with the present invention, the helical conductors may be fed in phase at the midpoint of the conducting cylinder in such a manner to provide a vertically polarized radiation field without interconnecting the antenna with a phase shifter at the input coupler as required by conventional vertically polarized helical antenna systems. In the present invention, the input coupler may include, in a preferred form, a coaxial distributor manifold connected through a flexible coaxial line to the source of the electromagnetic energy. The distribution manifold is cylindrical and is ruggedly mounted within the conducting cylinder. Four axially spaced output terminals protrude radially from the manifold through the central cylinder and into contact with the respective ends of the pairs of helical conductors at selected coupling points about the central cylinder. The axial distance between the output terminals of the manifold is related to the turn length of the conductors in accordance with $N\lambda_f/2 \sin \alpha$, where N is any add integer, $\lambda_f$ is the formation wavelength, and $\alpha$ is the pitch angle of the pairs of conductors. Employing this spacing, the input energy to the pairs of conductors is properly phased to increase the effective radiation per unit length of the antenna.

Further objects and advantages of the invention will become more apparent from the following detailed description taken in conjunction with the accompanying drawings which form a part of this specification.

In the drawings:

FIGURE 1 is a partial section of an earth formation including a salt dome penetrated by a borehole and illustrates a logging sonde and other apparatus for energizing and transporting the sonde in logging the salt dome;

FIGURE 2a is a representation of the face of a recording instrument displaying the information to be derived from the logging sonde of FIGURE 1;

FIGURE 2b is a two-dimensional plot of the near flank of the salt dome of FIGURE 1 is a function of depth;

FIGURE 3 is an elevational view of the logging sonde of FIGURE 1 partially cut away to illustrate a helical antenna adapted to radiate electromagnetic energy for logging the distance to the flank of the dome of FIGURE 1;

FIGURE 4 is a partial perspective section of the dome of FIGURE 1, illustrating the disc-like radiation pattern of equiazimuthal, vertically polarized, energy from the helical antenna of FIGURE 3 to the flanks of the salt dome;

FIGURE 5 is a plot of electric field components of the emitted energy along sections of the helical antenna of the present invention illustrating how the components are resolved to generate vertically polarized electromagnetic radiation;

FIGURE 6 is a second plot of the electric field components along the antenna to illustrate the generation of horizontally polarized radiation;

FIGURES 7 and 8 are elevational views of the helical antenna of FIGURE 3 in which the antenna is adapted to generate vertically polarized electromagnetic radiation; FIGURE 8 being enlarged and partially cut away to illustrate a coupler at the interior of the antenna;

FIGURES 9 and 10 are elevational views of a second embodiment of the helical antenna of FIGURE 3 adapted to radiate horizontally polarized electromagnetic radiation; FIGURE 10 being enlarged and partially cut away to illustrate energization means at the antenna interior;

FIGURE 13 is an exploded view of the housing of the coupler of FIGURE 12;

FIGURE 14 is an isometric view of the inner conductor sections of the coupler of FIGURE 12; and FIGURE 15 is a sectional view taken along line 15—15 of FIGURE 14.

Figures 11, 12:
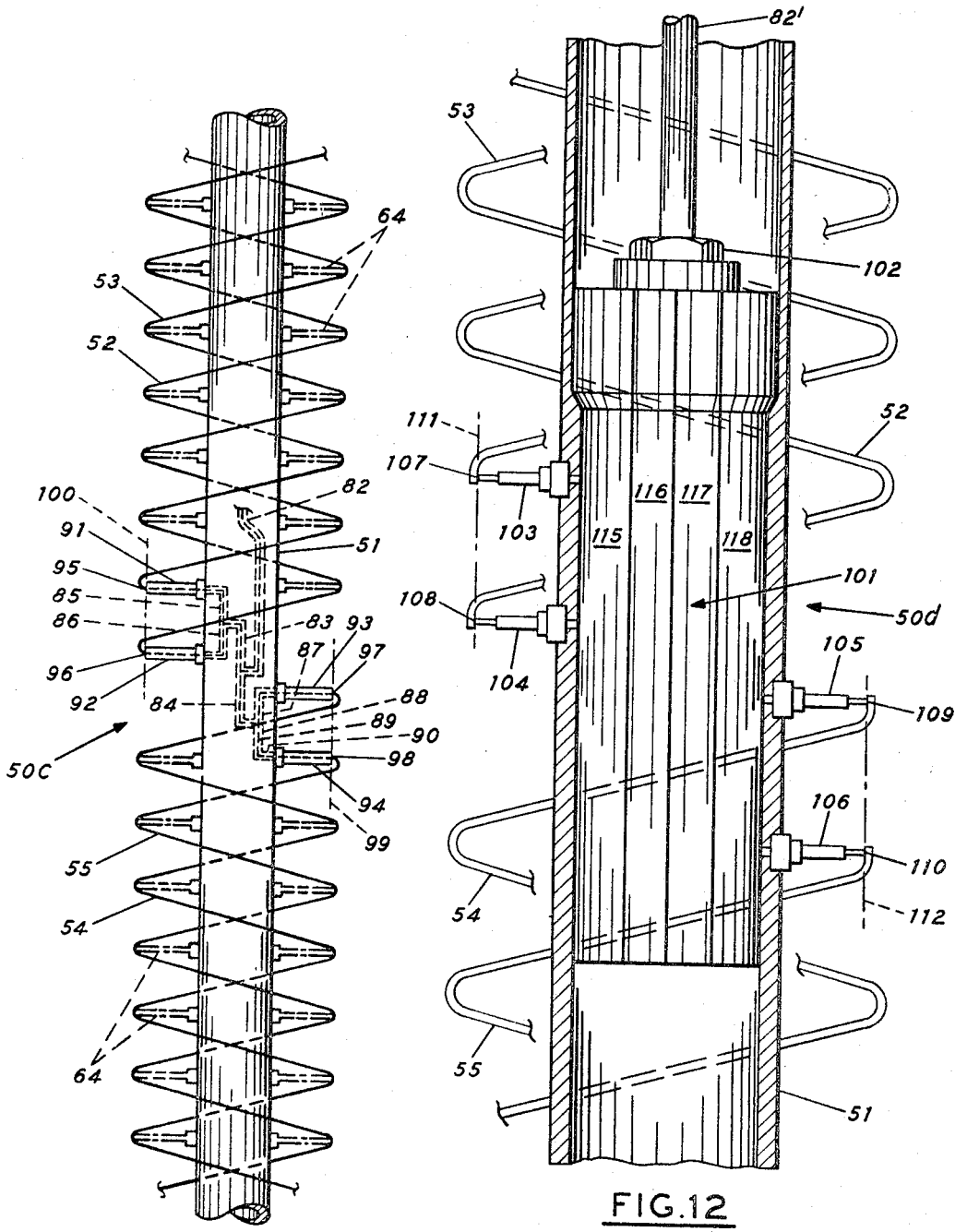
FIGURE 11 is an elevational view of another embodiment of the helical antenna of the present invention partially cut away to illustrate the antenna coupler.
FIGURE 12 is an elevational view of still another embodiment of the helical antenna of the present invention.

Referring now to FIGURE 1, a section of a salt dome 10 is shown penetrated by a borehole 11 offset from the center of the dome so as to be adjacent to one of its flanks. In order to accurately define the near side wall of the dome 10 through controlled emission and reception of electromagnetic energy, an exploration sonde 13 incorporating an electromagnetic helical antenna, generally indicated at 14, is transported along the borehole so as to be placed adjacent to differing horizontal sections of the dome. The purpose of mapping the near side of the salt dome-sedimentary interface 12 is to identify those areas where oil deposits 15 are most likely to be found adjacent the side wall of the dome.

To provide movement of the sonde 13 through the borehole 11, a logging cable 16 is connected through sheaves 17 on derrick 18 to cable drum 19. Motor 20 powers drum 19 on hoist truck 21 to raise and lower the sonde.

As the borehole 11 may be filled with a dense drilling fluid to prevent intrusion of the earth formation into the borehole, the sonde 13 must be fluid-tight at the mating joints of the upper housing 22 with lower housing 23 supporting the helical antenna 14. The upper housing 22 is connected to the lower housing 23 by union collar 24 as indicated.

Located within truck 21 is a console 25 containing a power source and associated coupling circuitry suitable for feeding timing signals along logging cable 16 to the sonde 13, as well as indicators for the source and coupling circuitry. Console 25 may also include surface recording equipment including at least three indicators: one for impedance match, indicator 27; another for depth, indicator 28; and another for distance, indicator 29. The impedance match displayed on indicator 27 relates to the power transfer between the helical antenna 14 and coupling circuitry within the sonde 13 as a function of their respective impedances, and the matching is performed downhole during operation of the antenna. Depth indicator 28 shows the mapping depth of the antenna in the borehole 11 and is measured by pulley 30. The distance from the borehole to the side wall of the near side of the salt dome at each mapping depth is a function of the time between transmission and reception of the electromagnetic energy by the antenna and is displayed on indicator 29. The information on the indicator 29 and the depth indicator 28 can be simultaneously recorded using a camera to product a photographic plate of the type indicated at 31 in FIGURE 2a. Plate 31 indicates the two-way travel time (2T) for the emitted signals, and a series of these photographs may be reduced to a two-dimensional plot, such as shown in FIGURE 2b, in which the location of the near wall of the salt body relative to the antenna axis 32 is represented by line 33 connecting mapped points A', B', C', D', E' etc.

Reference should now be had to FIGURE 3. This figure illustrates the energization section 40 for helical antenna 14 for utilizing timing signals fed from control console 25. As indicated, the energization section 40 includes transmitter 41 which is periodically energized through modulator (pulser) 42 so as to generate electromagnetic pulses of high power and relatively short duration. Since helical antenna 14 is used for both transmitting and receiving, a switching arrangement 43, called a duplexer, is connected across transmitter 41 and receiver 44 as indicated. As well understood, the duplexer 43 isolates the sensitive receiver 44 from the transmitter when energy is fed to the antenna and then connects the antenna to the receiver 44 in the interval between pulses where the reflected energy is to be received.

VSWR coupler 45 is connected so as to sense the energy transmitted between the duplexer 43 and the antenna 14. The coupler 45 samples the energy in the connecting transmission line to indicate the power transferred to the antenna as a function of the relative impedances of the antenna and the energization section 40. An antenna system is composed of a number of component parts, and associated with these components will be lengths of low-loss lines that are likely to be electrically "long" although physically "short."

In regard to matching the antenna 14 and energization sections 40 to the transmission line between these components, adjustments in the length of the line may be achieved in the present invention through a stub tuner 46 connected in parallel with VSWR coupler 45. Operation of tuner 46 is adjustably controlled by circuitry within the console 25 as the console operator monitors the response of VSWR coupler 45 at indicator 27 (FIGURE 1).

During actual operation of the antenna system, energy is symmetrically coupled at a mid-portion of the antenna 14 by coupler 50 connected in series with energization section 40. During such operation, helical antenna 14 fundamentally may be thought of as a transmission line directing the transmission of first and second pairs of electromagnetic waves beginning at coupler 50 and helically winding in opposite axial directions to the remote ends of the antenna. The first pair of waves propagates in helical paths between a first pair of coextensive helical conductors 52 and 53 and central cylinder 51 interior of the helical conductors as indicated in FIGURE 3. The second pair of waves helically propagates in a similar manner but in an opposite axial direction to that of the first pair of waves between a second pair of coextensive helical conductors 54 and 55 also coextensive with the central conductor 51. The helical conductors 52, 53 and 54, 55 are radially spaced from the central conductor 51 a constant radial distance $S_r$ and helically wind at a constant pitch angle $\alpha$ about the central conductor 51. Across a mid-portion of the central conductor 51, the adjacently located ends of the helical conductors, termed "near" ends, are connected to the coupler 50 as shown.

In analyzing the pairs of electromagnetic waves, several characteristics become evident. For example, as each pair of waves propagates along the antenna, their phases remain identical although varying periodically with distance from the coupler 50; however, their amplitudes decay as radiation from the antenna occurs. Each wave thus contributes to the intensity of the resultant radiation field.

As previously indicated, the helical conductors 52, 53 and 54, 55 and the central cylinder 51 are designed to direct the transmission of electromagnetic energy along helical paths about the cylindrical conductor 51. Accordingly, as the waves are composed of electric and magnetic fields that adjust their configurations to satisfy Maxwell's boundary equations, the physical dimensions of the pairs of helical conductors 52, 53 and 54, 55 and central cylinder 51 are of importance. For example, the circumferential turn length of the helical conductors must be designed to be greater than the radial spacing $S_r$ between the helical conductors and the central cylinder 51. Accordingly, the coupling of the electromagnetic waves between adjacent turns will be greater than that between the helical conductors and the central cylinder. Furthermore, circumferential turn length of the helical conductors should also be a common value along the full extent of the antenna. Each turn length is preferably made equal to a value related to the phase of the adjacent pairs of electromagnetic waves so that they are correctly phased for interaction in both the transverse and axial directions along the length of the antenna. In this regard, a preferred common turn length of $M\lambda_f$, where M is any integer (preferably one) and $\lambda_f$ is the operating wavelength of electromagnetic energy in the salt dome, is preferred.

Although the physical dimensions of the pairs of helical conductors are preferably equal, as previously mentioned, it may be desirable on some applications to deviate from the preferred construction. For example, the first pair of helical conductors 52, 53 may have a different turn-to-turn spacing than the second pair of helical conductors 54, 55 in order to generate circularly polarized radiation. Additionally, the use of the antenna in deep, narrow boreholes is seen to be aided by the fact that, even if the radial spacing $S_r$ should be reduced (thereby reducing the radiation per unit length of the antenna), the antenna is still adequate for most logging applications.

The first and second pairs of helical conductors 52, 53 and 54, 55 are constructed to be symmetrical on either side of a reference plane perpendicular to the axis of the central cylinder 51. The reference plane passes through the midpoint of coupler 50. Such symmetry permits an interaction between the first and second pairs of electromagnetic waves propagated in opposed axial directions to establish controlled polarization of the resultant radiated field.

The polarization of the radiated energy relates to the direction of the electric field components of the radiated field in the principal direction of propagation. As illustrated in FIGURE 4, the radiated energy from a broadside radiating the helical antenna within sonde 13 is in the form of an expanding solid of revolution having uniform radiation in planes traverse to the axis 32 of the antenna. A small section of the energy is called a wave front, generally indicated at 26. The wave front 26 is located perpendicular to the direction of travel of the energy as the energy propagates from the borehole 11 in radial directions through the salt dome 10. The wave front ultimately encounters the interface 12 of the salt body and the surrounding formation, and a portion of the energy is reflected. The electric field components at the wave front may be disposed in a linear alignment in one of two directions: either perpendicular to the antenna axis 32 or parallel to it.

When the electric field component is normal to the axis 32 of the antenna, the distribution is termed horizontally polarized radiation. When the electric field component is parallel to the axis 32 of the antenna, the distribution is called vertically polarized radiation. When the electric field components disposed on the wave front have resultant vectors in both the vertical and horizontal directions, the distribution is called circularly polarized radiation.

In general, the electric field component of the pairs of electromagnetic waves along the antenna is parallel to the incremental length of the helical conductor from which it radiates. Furthermore, each electric field component has an amplitude and direction equal to the instantaneous signal current flowing in the incremental conductor lengths. These orientations are maintained as the electromagnetic energy radiates from the antenna. Where the conductor lengths make an angle with the principal direction of propagation, there are thus provided electric field components that make an angle with the axis 32 of the antenna that is the same as the pitch angle α of the pairs of helical conductors 52, 53 and 54, 55.

Furthermore, the electric field components of the pairs of electromagnetic waves on the antenna also have the property of interacting with each other. They are vector qualities which are governed by the principles of vector algebra. Accordingly, the pairs of electromagnetic waves propagating in opposed axial directions on the antenna may be adapted to interact as a function of their position along the antenna, as measured in opposed but equal axial distances from the center of the antenna so as to provide linear polarization of the resulting radiation.

For example, to provide vertical polarized radiation, the signal currents on the transversely aligned portions of each pair of helical conductors, say helical conductors 52, 53, must be the same magnitude and of equal polarity relative to each other but, most importantly, be of opposite polarity to the symmetrically located signal currents on the oppositely extending pair of helical conductors (for this example, helical conductors 54, 55) at equal distances from the center of the antenna as measured in the same azimuth direction from the longitudinal axis of the antenna. As indicated in FIGURE 5, when these conditions exist, electric field components represented by arrows 56, 57, 58 and 59 are generated along the antenna. These arrows represent the instantaneous electric fields found in axially spaced sections of the helical conductors defined by an imaginary geometrical figure having a wedge-shaped cross section, one corner of which lying on antenna axis 32 and two remaining corners lying on parallel lines 34 and 35 radially spaced from and parallel with the antenna axis 32. As the eectric field componnets of the pairs of waves are symmetrical about the midpoint of the antenna, they may be resolved into reinforced vertical field vectors 56b, 57b, 58b and 59b radiating from the antenna and cancelable horizontally aligned electric field vectors 56a, 57a, 58a and 59a. Accordingly, the first pair of waves interacts with the second pair of waves to generate vertically polarized electromagnetic radiation.

To provide horizontally polarized radiation, the field currents on transversely aligned portions of each pair of helical conductors 52, 53 and 54, 55 must also be of equal magnitude and of opposite polarity as before but, most importantly, must be of the same polarity as respective signal currents at a corresponding symmetrical plane on the other pair of helical conductors. As indicated in FIGURE 6, when these conditions exist, electric field components represented by arrows 60, 61, 62 and 63 are generated along the antenna in a region defined by antenna axis 32 and parallel lines 34 and 35. These components are resolvable, as previously explained, into reinforced horizontal electric field vectors 60a, 61a, 62a and 63a and cancelable vertically directed field vectors 60b, 61b, 62b and 63b. Accordingly, the first and second pairs of waves axially propagating along the antenna away from the midpoint interact to generate horizontally polarized radiation.

It is known that when an antenna is not terminated in its characteristic impedance, there will be two traveling waves on the antenna, one carrying power toward the terminating end "incident wave" and the other carrying power away from the end "reflected wave." The net power radiated from the antenna is the difference in the power contained in the two waves. Furthermore, as the waves propagate, the antenna absorbs power from each wave and thusly causes a corresponding reduction in gain of the antenna.

As indicated in FIGURE 3, to prevent reflective waves from each end of the antenna of the present invention, terminals 65a and 65b are formed of an electrically conductive material; and the terminals 65a and 65b are adapted to be spaced apart along central cylinder 51 in contact with both the pairs of helical conductors 52, 53 and 54, 55 and the central cylinder 51. As incident pairs of waves traveling down the antenna are reflected in part at any discontinuity where they encounter an impedance other than the impedance of the line on which they travel, the magnitude and phase of the reflected waves, say from posts 65a and 65b, will depend upon the amplitude and phase of the reflecting impedance. If a common impedance load is used to terminate both helical conductors, the relative amplitude and phase of the reflected waves will be the same. The resultant reflected waves of each pair of waves will be maximum when the reflected waves add in phase and minimum where they are opposed in phase. Thus, if the length between posts 65a and 65b at each end of the antenna is equal to $N\lambda_f/4$, where N is any odd integer and $\lambda_f$ is the operating wavelength of energy in the salt body, each pair of reflected waves will have a relative phase difference of $\lambda_f/2$ or its equivalent as measured in common transverse planes normal to the axis of the antenna. (Wavelength is defined as one cycle of variation of the energy in the principal direction of propagation.) In the above embodiment, the distance between terminals 65a and 65b is measured along the longer of each pair of helical conductors between the transverse plane through the terminals; i.e., along helical conductors 53 and 54. Since the relative strength of the reflected waves is the same, the pair of reflected waves, due to connecting the ends of each pair of helical conductors 52, 53 or 54, 55 to the central cylinder 51, are thus completely canceled, minimizing the voltage standing wave ratio (VSWR) of the antenna. The voltage standing wave ratio (VSWR) is defined as the ratio of the maximum to the minimum field strength of the incident and reflected waves as the position along the line is varied through a distance of at least a half wavelength.

With regard to the operating frequency of the system, loss-tangent measurements on samples of halide taken from salt domes indicate rather low loss for energies in the frequency range from $10^6$ to $10^{10}$ cycles per second. Above this range, the losses become excessive; below this range, the resolution of returning echoes becomes difficult. Inasmuch as operating frequency is directly related to the operating wavelength, a preferred range of operating wavelength for the energy used in conjunction with the antenna of the present invention is thus from $1.24 \times 10^{-2}$ to $1.24 \times 10^2$ meters in length or integral equivalents thereof.

In FIGURES 7 and 8, a coupler embodiment, generally indicated at 50a, feeds energy to the helical antenna of the present invention to generate vertically polarized electromagnetic radiation. As the coupler 50a has the effect of combining the characteristic impedance of the helical conductors 52, 53 and 54, 55 in parallel, the "match" of the helical conductors to the input transmission line 66 is thus facilitated.

As shown in FIGURE 7, the energy is fed from input line 66 to coupler 50a and then is connected to the antenna between the pairs of helical conductors 52, 53 and 54, 55 and central cylinder 51. As the helical conductors are insulated from the central cylinder, as by posts 64, voltages and currents are established along the helical conductors and the central cylinder for generating first and second pairs of axially propagating electromagnetic waves as previously mentioned. The resulting pairs of electromagnetic waves propagate in opposed axial directions from input coupling posts 73, 74, 75 and 76 of the coupler 50a toward terminals 65a and 65b at the ends of the antenna.

As shown in FIGURE 8, coupler 50a also includes a series of split conductors forming extensions of the input line 66. In particular, coaxial line sections 68 and 69 are connected in parallel to the input line 66 and terminate in contact with coaxial extensions 70 and 71, respectively, at a plane near the midpoint of the antenna. The extensions 70 and 71 are seen to be perpendicularly oriented relative to the line sections 68 and 69 and connect via inner conductor 72 to the coupling posts 73, 74, 75 and 76. The coupling posts in turn connect to pairs of helical conductors 52, 53 and 54, 55 at coupling points located exterior of the central cylinder 51. These coupling points are generally indicated at 78, 79, 80 and 81. Viewed from a side of the antenna (FIGURE 8), the coupling points define an imaginary parallelogram having parallel opposite sides. The two diagonally located coupling points 78 and 80 connect to the inner conductor of extension 70 and form one set of coupling points. The other two diagonal coupling points 79 and 81 connect to the inner conductor of extension 71 and form a second set of coupling points. As coupling posts 73, 74, 75 and 76 have insulated side walls, the coupler circuit is closed at the bases of the coupling posts by connecting the outer conductor of the extensions 70 and 71 to the central cylinder 51.

Energizing the antenna conductors with signal currents of the correct polarity depends upon the line length of section 68 relative to section 69. Accordingly, if section 68 is constructed so that its length is exceeded by the length of section 69, say by a distance equal to $\lambda_f/2$, where $\lambda_f$ is the operating wavelength of energy in the salt body as previously defined, correct feed conditions exist. Each pair of helical conductors 52, 53 and 54, 55 has one conductor fed from the coupling points 78, 80 and one fed from the coupling points 79, 81 so that the energization on the conductors of each pair is 180° out of phase. It should be noted that, while along successive transverse sections of the helical conductors the polarity of the signal current undergoes periodical change, the relative polarity along the antenna remains 180° out of phase to generate the desired vertically polarized energy from the antenna.

However, the adjacent—axially spaced—coupling points 79, 80 and 78, 81, being of opposite polarity, must be sufficiently insulated to prevent breakdown during operation of the antenna. In this regard, an air-dielectric may be suitable as an insulator in low-power antenna applications although dielectric strength of the medium may have to be increased for high-power operations, as by a separate ceramic insulating member between the adjacent coupling points 79, 80 and 78, 81.

In FIGURES 9 and 10, a second embodiment of the coupler of the present invention is generally indicated at 50b for properly energizing the antenna to generate horizontally polarized electromagnetic radiation. As shown in FIGURE 9, the energy is fed from input line 66' to coupler 50b and then is connected to the antenna between the pairs of helical conductors 52, 53 and 54, 55 and central cylinder 51. As the helical conductors are insulated from the central cylinder by posts 64, voltages and currents are established along the helical conductors and the central cylinder for generating the pairs of axially propagating electromagnetic waves previously mentioned. The resulting pairs of electromagnetic waves propagate in opposed axial directions from input coupling posts 73' and 74' of the coupler 50b toward the ends of the antenna.

As shown in FIGURE 10, the coupler 50b also includes a series of conductors forming the extensions of the input line 66' similar to the coupler 50a of FIGURES 7 and 8. As indicated, sections 68' and 69' are connected in parallel to the input line 66' and terminate at a plane near the midpoint of the antenna in contact with coaxial extensions 70' and 71'. The extensions 70' and 71' connect via common inner conductor 72' to the coupling posts 73' and 74'. The posts in turn connect to the first and second pairs of helical conductors at two diametrically opposed coupling points indicated at 78' and 79'. Each coupling point is exterior of the central cylinder 51. As coupling posts 73' and 74' have insulated side walls, the coupler circuit is closed by connecting the outer conductor of the coupler to the central cylinder 51 at the bases of the coupling posts. To establish correct energization conditions, section 68' is constructed so that its length exceeds the length of 69' by a distance equal to $\lambda_f/2$ as previously defined. One conductor of each pair of coextensive helical conductors 52, 53 or 54, 55 thus is energized at a common coupling point 78' or 79' with the same phased signal, but each pair of helical conductors is energized with complementary polarized signal currents at the coupling points 78' and 79'. As these signals periodically vary along the antenna, the first and second pairs of electromagnetic waves propagate from the points 78' and 79' toward the remote ends of the antenna interacting, as previously explained, to generate horizontally polarized radiation.

In FIGURE 11, a third embodiment of coupler is generally indicated at 50c for properly energizing the antenna to generate vertically polarized electromagnetic radiation. The coupler 50c preferably includes a series of coaxial line sections indicated at 82, 83, 84, 85, 86, 87 and 88. These sections are geometrically arranged and form a single input section 82 to a series of output sections 85, 86, 87 and 88 through intermediate sections 83 and 84. As indicated, the sections have a common inner conductor 89 and a common outer conductor 90. The inner conductor 89 is connected to helical conductors 52, 53, 54 and 55 by coupling posts 91, 92, 93 and 94 at the exterior of the central cylindrical conductor 51. As the coupling posts 91, 92, 93 and 94 have insulated side walls, the outer conductor 90 of the output sections 85, 86, 87 and 88 may all be connected to central cylinder 51 at the bases of the coupling posts.

As indicated, the coupling points 95, 96, 97 and 98 are not transversely aligned, as is the case in the coupler 50a of FIGURES 7 and 8, but instead are connected to the adjacent ends of the helical conductors 52, 53, 54 and 55 at coupling points 95, 96, 97 and 98 axially spaced along central cylinder 51. The coupling points define two sets of points. Each set of points 95, 96 or 97, 98 is azimuthally spaced so that the individual coupling points are aligned along a line 99 or 100 parallel to the longitudinal axis of the central cylinder 51, but each set is also diametrically located with respect to the other set of coupling points. Preferably, where the turn length of the helical conductors 52, 53, 54 and 55 is equal to an integral full operating wavelength, each of the more remote coupling points—coupling points 95 or 98—is spaced a common distance from the mating coupling points 96 or 97. When measured along one of the helical conductors, the distance is equal to one-half turn length or its integral equivalent of the measuring conductor. One of each pair of the coextensive helical conductors is thus shortened relative to the other helical conductor over the longitudinal length of the coupler 50c. An equivalent expression for the spacing of the coupling points, when measured along lines 99 or 100 and between transverse planes through the coupling points, is $M\lambda_f/2 \sin \alpha$, where M is any odd integer, $\lambda_f$ is the operating wavelength as previously defined, and $\alpha$ is the pitch angle of the helical conductors.

In FIGURES 12, 13, 14 and 15, a fourth embodiment of the coupler is generally indicated at 50d for use in vertical polarization energy applications in which shocks, due to rough handling, may occur. As indicated in FIGURE 12, coupler 50d comprises a distribution manifold 101 supported in contact with conducting cylinder 51. An input coaxial connector 102 is attached to a remote transverse end of the manifold 101. A series of output couplers 103, 104, 105 and 106 are connected at axially spaced locations along the length of the manifold 101. As indicated in FIGURE 12, the couplers 103, 104, 105 and 106 have bases attached to central cylinder 51, and radially directed extensions connect to the adjacent ends of the pairs of helical conductors 52, 53 and 54, 55. Preferably these parts are connected at two sets of selected coupling points about the central cylinder 51 indicated at 107, 108 and at 109, 110. Each set of points 107, 108 or 109, 110 is azimuthally spaced so that it is aligned along a line 111 or 112 parallel to the longitudinal axis of the central cylinder 51. The lines 111 and 112 are also diametrically opposed. Where the turn circumferential length of the helical conductors 52, 53 and 54, 55 is equal to an integral full operating wavelength, the spacing between the coupling points 107, 108 or 109, 110 is equal to one-half circumferential turn length or its integral equivalent, measured along the longer of each pair of helical conductors beginning at the center of the antenna, as previously explained.

Essentially, manifold 101 is electrically equivalent to the coupler 50c of FIGURE 11. Energy is fed from the input transmission line 82' to input coupler 102 then through the manifold 101 to the center of the antenna between the pairs of helical conductors 52, 53 and 54, 55 and to cylindrical conductor 51. Within the manifold 101, the input signal currents are divided, as explained below: Voltages are developed between the pairs of helical conductors and the central cylinder by connecting the outer conductor of the input line 82' to the central cylinder 51 through the coupler 102 at the end of the manifold 101. The coupler 102 in turn connects to the central cylinder 51 through the side wall of the manifold 101 in surface contact with the central cylinder 51.

Manifold 101 need not be unitarily formed. As indicated in FIGURE 13, the manifold 101 may be laminated, comprising a plurality of conducting plates 115, 116, 117 and 118 having a plurality of broad surfaces parallel to the longitudinal axis of symmetry of the manifold. Across the broad surfaces of the plates are provided a series of concavities 119, 120, 121, 122 and 123 progressing from a single input concavity 119 to a series of output concavities 120, 121, 122 and 123. The concavities are constructed so that, as the plates 115, 116, 117 and 118 are stacked in horizontal mating contact along the adjacent broad surfaces, they are adapted to mate to form grooves of circular cross section.

Within the mated concavities 119, 120, 121, 122 and 123 is assembled a split, similarly oriented, inner conductor section 125 of FIGURE 14. The conductor section 125 is shown removed from contact with plates 115, 116, 117 and 118. As indicated, section 125 is split into a series of segments 131, 132, 133, 134, 135, 136 and 137 connectable to respective extensions 138 of output posts 103, 104, 105 and 106. The posts are indicated as being connected to the central cylinder by nuts 139.

Along the section 125 are a series of wafers 140 of circular cross section located within the mated concavities of the manifold having a central opening through which a segment of the inner conductor section 125 extends. The wafers 140 are formed of electrically insulating material.

When the inner conductor section 125 is supported between the plates 115, 116, 117 and 118 the minimum radial spacing between the inner conductor section and the side wall of the plates is determined by the dielectric strength of the medium carrying the electromagnetic waves. For air-dielectric transmission lines, the maximum potential gradient at sea level pressure is about 30,000 volts per centimeter. Where the radial spacing between the parts becomes limited, as across segments 131, 132 and 133 where the wafers 140 are of smaller diameter, it is desirable to further reduce the radial spacing below the normal breakdown gradient of the air-dielectric transmitting medium. In such applications, arcing may be avoided by introducing a gas, such as nitrogen (dielectric constant≃1), within the manifold 101 at a pressure greater than that of the amosphere, say 300 p.s.i. The maximum power that can be transmitted by the manifold coupler is thereby increased to that having at least a tested breakdown potential gradient of say 100,000 volts per cm.

In operation, signal currents are coupled by the input segment 131 of the inner conductor section 125 (FIGURE 14) to a plane near the midpoint of the manifold where the currents then divide at output segments 134, 135, 136 and 137 for ultimae connection to coupling posts 105, 106, 107 and 108. As indicated in FIGURE 15, segments 132 and 133 may have ends arcuately formed changing the relative elevations of the output segments 134, 135, 136 and 137 to further aid in forming an antenna of minimum diameter. Furthermore, to facilitate matching of the system, the segments 132, 133, 134, 135, 136 and 137 preferably have different impedance values so that the input line 82' (FIGURE 12) may be formed of a commonly available transmission line.

While certain preferred embodiments of the invention have been specifically disclosed, it should be understood that the invention is not limited thereto as many variations will be readily apparent to those skilled in the art and the invention is to be given its broadest possible interpretation within the terms of the following claims. For example, the pairs of electromagnetic waves propagating in opposed axial directions away from the midpoint of the antenna may be controlled by suitable phase controllers to interact to radiate circularly polarized electromagnetic energy into the adjacent earth formation.

We claim:

1. In a subsurface earth formation exploration tool for logging an earth formation penetrated by a borehole to approximate the distance to an electromagnetic discontinuity in said formation from said borehole, a helical antenna for irradiating said formation with electromagnetic radiation uniformly and transverse to the axis of said borehole, comprising:
   (a) a central conductor element axially elongated along the axis of said borehole;
   (b) first and second pairs of helically conducting elements wound axially along and radially spaced outwardly from said central element;
   (c) said first and second pairs of helical conducting elements beginning substantially at said midpoint of said cylindrical element, each pair of said helical elements winding in the same circumferential direction about said central element and extending toward an end of said central element, one pair extending toward one end of said central element and the other pair extending toward the opposite end of said central element; and
   (d) means adjacent said midpoint of said central element for coupling electromagnetic energy between said central element and said conducting elements of said pairs of helical conducting elements, the energization points for each element being selected to produce first and second pairs of electromagnetic waves, each of said pair of waves propagating in phase in an axial direction along said antenna and radiating in phase in planes transverse to the axis of said borehole to produce a uniform resultant transverse radiation pattern in the formation penetrated by said borehole.

2. A helical antenna as in claim 1 in which said first and second pairs of electromagnetic waves interact as a function of the position of said first pair of waves relative to the second pair of waves, said position of interaction being in opposed but equal axial distances from said coupling means to thereby generate resultant horizontally polarized electromagnetic radiation in said formation penetrated by said borehole.

3. A helical antenna as in claim 2 in which:
   said first pair of helical conducting elements includes first and second helical conductors extending in the same circumferential direction about said cylindrical element, said first and second helical conductors having ends coupled to said coupling means at first and second coupling points, respectively, exterior of said cylindrical element;
   said second pair of helical conducting elements includes third and fourth helical conductors extending in the same circumferential direction about said cylindrical element as that of said first and second helical conductors but in opposite axial directions therefrom, said third and fourth helical conductors having ends coupled to said coupling means near the midpoint of said cylindrical element at third and fourth coupling points, respectively;

said first and second coupling points aligned along an imaginary line parallel to the axis of said antenna so that said first helical conductor is shortened relative to said second conductor measured from said midpoint;

said third and fourth coupling points aligned along an imaginary line parallel to the axis of said antenna so that said third helical conductor is shortened relative to said fourth helical conductor as measured from said midpoint;

said imaginary line connecting said third and fourth coupling points being diametrically opposed to that connecting said first and second coupling points.

4. A helical antenna as in claim 3 in which each of said helical conductors has the same circumferential length and winds in a common circumferential direction about said cylindrical element away from one of said coupling points, said circumferential length being proportional to an operating wavelength of the electromagnetic energy propagated through said formation.

5. A helical antenna as in claim 4 in which said first helical conductor is shortened approximately a half of one integral turn relative to said second helical conductor between said first and second coupling points, and said third helical conductor is also shortened approximately a half of one integral turn relative to said fourth helical conductor between said third and fourth coupling points.

6. A helical antenna as in claim 5 in which said coupling means includes a two-wire transmission line adapted to provide energy of the same phase at each of said coupling points, one wire of said line being connected to the parallel connection of said coupling points and said other wire of said line being connected to said cylindrical element.

7. A helical antenna as in claim 6 in which:
(a) said two-wire transmission line connects to said antenna by means of a cylindrical distribution manifold supported within said cylindrical element near the midpoint thereof;
(b) said manifold including a housing of electrically conductive material in surface contact with said cylindrical element and being connected to said other wire of said transmission line, said housing having a plurality of cylindrical grooves therethrough including a single input groove and a plurality of output grooves, said input groove being in communication with each output groove and each output groove terminating adjacent to one of said coupling points, a central conducting wire within said grooves connected to said one wire of said transmission line, said conducting wire being connected to said coupling points in parallel.

8. A helical antenna as in claim 7 in which said housing of said manifold comprises a plurality of conducting plates having a plurality of broad surfaces, said plates being stacked in longitudinal mating contact along said broad surfaces.

9. A helical antenna as in claim 8 in which said broad surfaces of adjacently stacked conducting plates have mating concavities therealong and said concavities are alignable to form said plurality of cylindrical grooves.

10. A helical antenna as in claim 2 in which:
(a) each of said first and second pairs of helical conducting elements includes first and second helical conductors extending in the same angular circumferential direction about said central element, said first and second helical conductors having ends coupled to said coupling means at first and second diametrically opposed coupling points exterior of said cylindrical element;

(b) said first coupling point being common to said first helical conductors of said first and second pairs of conductors, said second coupling point being common to said second helical conductors of said first and second pairs of conducting elements.

11. An antenna as in claim 10 in which coupling means includes a two-wire transmission line, one wire of said line being connected to the parallel connection of said first and second coupling points, and said other wire of said line being connected to said central element, said transmission line being adapted to couple energy in opposite phase at said first coupling point relative to said second coupling point.

12. A helical antenna as in claim 1 in which said first and second pairs of electromagnetic waves interact as a function of the position of said first pair of waves relative to said second pair of waves, said position of interaction being measured along said cylindrical element in opposed but equal axial distances from said coupling means to thereby generate resultant vertically polarized electromagnetic radiation in said formation penetrated by said borehole.

13. A helical antenna as in claim 12 in which said first and second pairs of helical conductors are connected to said coupling means at four coupling points equally spaced in radial directions from said axis of said antenna, said four coupling points being exterior of said cylindrical element and definng corners of an imaginary, axially extending parallelogram having parallel opposite sides, the two diagonally located coupling points of said parallelogram forming one set of coupling points and the other diagonally located coupling points forming a second set of coupling points.

14. A helical antenna as in claim 13 in which said coupling means includes first and second two-wire transmission lines, one wire of said first transmission line being connected to the parallel connection of said first set of diagonal coupling points and said other wire being connected to said cylindrical element, one wire of said second transmission line being connected to the parallel connection of said second set of diagonal coupling points, and said other wire being connected to said cylindrical element, said first and second transmission lines being adapted to couple energy in opposed phase at said first set of diagonal points relative to said second set of diagonal coupling points.

15. A helical antenna as in claim 1 in which each pair of helical conducting elements includes first and second coextensive helical conductors extending in the same circumferential direction about said cylindrical element beginning at said coupling means and helically winding therefrom, and including first and second terminals connected to said first and second helical conductors so as to electrically connect said helical conductors to said central cylindrical element, said first and second terminals being adapted to be loaded so as to cancel reflected waves propagating from said remote end of said antenna toward said coupling means.

16. A helical antenna as in claim 15 in which said first and second remote terminals of said first and second helical conductors are spaced apart a relative distance equal to $M\lambda_f/4$ where M is any odd integer and $\lambda_f$ is the operating wavelength of the energy in said formation, said distance being measured in a circumferential direction along one of said helical conductors between transverse planes through said first and second terminals.

17. A method of irradiating an earth formation penetrated by a borehole to approximate the distance to an electromagnetic discontinuity in said formation from said borehole, comprising the steps of:
coupling electromagnetic energy to a multiplicity of helical conductors and a central cylindrical element coextensive with said helical conductors at a series of coupling points near a mid-portion of said cylindrical element to propagate first and second pairs of electromagnetic waves along and radiating from said conductors into said formation, each of said waves being specified in terms of voltages existing between the helical conductors and the central cylindrical element and of currents carried by the helical conducting elements and by said cylindrical element;

directing said first pair of electromagnetic waves in helical paths of common angular direction about said cylindrical element from said mid-portion of said cylindrical element toward a remote end of said cylindrical element;

directing said second pair of electromagnetic waves in helical paths in an angular direction common to said first pair of waves about said cylindrical element from said mid-portion of said cylindrical element in an axial direction opposed to that of said first pair of waves, each of said first and second pairs of electromagnetic waves having equal phases as a linear function of the position of said each pair of waves along said conductors in a direction away from said coupling points so as to increase radiation per unit length along said antenna; and controlling the direction of electric fields of said first and second pairs of electromagnetic waves as a function of the symmetrical position of said waves as measured along said central element in opposite but equal axial directions from said coupling points to radiate polarized electromagnetic radiation into said formation.

18. A method as in claim 17 in which the step of controlling the direction of the electric fields of said first and second pairs of electromagnetic waves includes canceling horizontal components of said electric fields as a function of the symmetrical position of said first pair of waves relative to said second pair of waves as measured along said central element in opposed but equal axial distance from said coupling points to radiate vertically polarized radiation from said formation, said canceled components of said electric fields being located in planes perpendicular to the longitudinal axis of said central cylindrical element.

19. A method as in claim 17 in which the step of controlling the direction of the electric fields of said first and second pairs of electromagnetic waves includes canceling vertical components of the electric fields of said first and second waves as a function of the symmetrical position of said waves in opposed but equal distances from said coupling points to radiate horizontally polarized radiation into said formation, said canceling components of said electric fields being located in planes parallel to the longitudinal axis of said central cylindrical element.

References Cited

UNITED STATES PATENTS

| | | | |
|---|---|---|---|
| 2,616,046 | 10/1952 | Marston et al. | 343—895 XR |
| 2,953,786 | 9/1960 | Krause | 343—895 |
| 2,985,878 | 5/1961 | Krause et al. | 343—895 |
| 3,066,294 | 11/1962 | Pan et al. | 343—895 XR |
| 3,083,364 | 3/1963 | Scheldorf | 343—895 XR |
| 3,111,669 | 11/1963 | Walsh | 343—895 XR |
| 3,286,163 | 11/1966 | Holser et al. | 324—6 |

FOREIGN PATENTS

| | | |
|---|---|---|
| 1,204,354 | 1/1960 | France. |

RUDOLPH V. ROLINEC, *Primary Examiner.*

G. R. STRECKER, *Assistant Examiner.*

U.S. Cl. X.R.

324—5, 7; 343—895